(12) United States Patent
Murakami

(10) Patent No.: US 12,715,067 B2
(45) Date of Patent: Aug. 25, 2026

(54) GALVANO SCANNER AND LASER MACHINING DEVICE USING THE SAME

(71) Applicant: Fanuc Corporation, Minamitsuru-gun (JP)

(72) Inventor: Yoshinori Murakami, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 714 days.

(21) Appl. No.: 18/029,180

(22) PCT Filed: Oct. 8, 2021

(86) PCT No.: PCT/JP2021/037290
§ 371 (c)(1),
(2) Date: Mar. 29, 2023

(87) PCT Pub. No.: WO2022/080247
PCT Pub. Date: Apr. 21, 2022

(65) Prior Publication Data

US 2023/0364709 A1 Nov. 16, 2023

(30) Foreign Application Priority Data

Oct. 13, 2020 (JP) ................................ 2020-172673

(51) Int. Cl.
*B23K 26/082* (2014.01)
*B23K 26/064* (2014.01)
(Continued)

(52) U.S. Cl.
CPC ........ *B23K 26/082* (2015.10); *B23K 26/0643* (2013.01); *B23K 26/0884* (2013.01); *B23K 26/36* (2013.01)

(58) Field of Classification Search
None
See application file for complete search history.

(56) References Cited

U.S. PATENT DOCUMENTS

2007/0210040 A1* 9/2007 Sakamoto ............ B23K 26/082 219/121.84
2011/0259862 A1* 10/2011 Scott ...................... B23K 26/34 219/121.73
(Continued)

FOREIGN PATENT DOCUMENTS

CN 107127465 A * 9/2017 ............ B23K 26/38
CN 107803595 A * 3/2018 ............ B23K 26/04
(Continued)

OTHER PUBLICATIONS

International Search Report and Written Opinion for International Application No. PCT/JP2021/037290, dated Dec. 21, 2021, 5 pages.

*Primary Examiner* — John J Norton
(74) *Attorney, Agent, or Firm* — BUCHANAN INGERSOLL & ROONEY PC

(57) ABSTRACT

A galvano scanner that performs scanning with a laser beam according to the present invention includes a galvano unit having a mirror and a mirror drive mechanism, a base member on which the galvano unit is mounted, an outer peripheral member disposed so as to surround the galvano unit, and a frame member to which the base member and the outer peripheral member are attached, and is configured such that the base member and the outer peripheral member are attached to the frame member via a sealing member.

8 Claims, 4 Drawing Sheets

(51) Int. Cl.
*B23K 26/08* (2014.01)
*B23K 26/36* (2014.01)

(56) References Cited

U.S. PATENT DOCUMENTS

| | | | | |
|---|---|---|---|---|
| 2017/0180688 | A1 | 6/2017 | Otsubo et al. | |
| 2018/0354070 | A1 | 12/2018 | Nogami | |
| 2020/0023461 | A1 | 1/2020 | Galbraith et al. | |
| 2020/0241289 | A1 | 7/2020 | Morinaga et al. | |
| 2022/0048134 | A1* | 2/2022 | Bernhard | B23K 26/064 |
| 2022/0276487 | A1 | 9/2022 | Suzuki et al. | |

FOREIGN PATENT DOCUMENTS

| | | | | |
|---|---|---|---|---|
| JP | 2001179479 | A | 7/2001 | |
| JP | 2004136351 | A | 5/2004 | |
| JP | 2004195491 | A | 7/2004 | |
| JP | 2017116588 | A | 6/2017 | |
| JP | 2019000851 | A | 1/2019 | |
| JP | 2020122961 | A | 8/2020 | |
| WO | WO-2012140797 | A1 * | 10/2012 | B23K 26/082 |

* cited by examiner

GALVANO SCANNER AND LASER MACHINING DEVICE USING THE SAME

CROSS REFERENCE TO RELATED APPLICATIONS

This is the U.S. National Phase application of PCT/JP2021/037290, filed Oct. 8, 2021, the disclosure of which is incorporated for all purposes.

FIELD OF THE INVENTION

The present invention relates to a galvano scanner unit that performs scanning with a laser beam in a laser machining device.

BACKGROUND OF THE INVENTION

A laser machining device, such as a laser cutter, a laser welder, or a laser marking device, can perform predetermined machining by transmitting a laser beam output from a laser oscillator to irradiate a workpiece with the laser beam and relatively moving the laser beam and the workpiece. As an example of the relative movement of a laser beam and a workpiece in such a laser machining device, scanning of the workpiece with the laser beam is known that uses a galvano scanner including, in an emission unit (for example, a machining head) of the laser machining device, a galvano mirror and a driving device to rotate the galvano mirror about a predetermined axis.

As an example of the laser machining device using such a galvano scanner, Patent Literature 1, for example, discloses a laser machine adapted to rotate a mirror about the axis so as to reflect a laser beam incident on the mirror in a predetermined direction, which is configured such that means for detecting a rotation angle of the mirror is a rotation angle sensor of an electrostatic capacity type and a container that airtightly houses the rotation angle sensor and the mirror is provided, with a portion of the container through which the laser beam transmits formed with a material that the laser beam can transmit. It is considered that according to such a laser machine, in the structure for performing scanning with a laser beam, even when the humidity outside the container changes, the humidity inside can be kept constant while the airtightness is secured, to thus enable machining with excellent machining accuracy.

Further, as another example of the laser machining device using the galvano scanner, Patent Literature 2, for example, discloses a laser marking device that includes a laser beam source that emits a laser beam, a galvano mirror disposed midway in an optical path of the laser beam from the laser beam source and changing a direction of the laser beam, a galvano drive means having a motor that rotates the galvano mirror to control a rotation angle of the galvano mirror and a drive circuit that drives the motor, and a converging lens that converges the laser beam from the galvano mirror and irradiates an object to be marked with the laser beam, the laser marking device adapted to mark a character, a symbol, a figure, and the like on the object to be marked and including a main body unit having the laser beam source, a head unit having the converging lens, the galvano mirror, and the galvano drive means, and coupling means that detachably couples these main body unit and head unit, in which the head units corresponding to various types of converging lenses with different rates of convergence are each exchangeable relative to the main body unit. Patent Literature 2 describes that, with such a laser marking device, when the converging lens is exchanged due to a change of a printing area or a focal distance, the whole head unit can be exchanged without requiring disassembling a scanning unit (scanning portion) of the laser marking device.

PATENT LITERATURE

Patent Literature 1

Japanese Patent Laid-Open No. 2001-179479

Patent Literature 2

Japanese Patent Laid-Open No. 2004-136351

SUMMARY OF THE INVENTION

With the use of a laser machining device including a scanning unit that performs scanning with a laser beam as described above, for example, "remote machining," which performs machining with the scanning unit disposed in a position distanced from a workpiece and by condensing a laser beam on the workpiece, has recently been performed. In particular, it becomes possible to transmit a laser beam to the emitting part through an optical fiber like a YAG laser, and against the background of the miniaturization of galvano mirrors and drive mechanisms, by attaching a unit including a galvano scanner to the tip of a moving mechanism such as a robot arm, it is becoming possible to perform laser processing on locations that were previously difficult to approach.

In such remote machining with a unit including a galvano scanner attached to a tip end of a moving mechanism, high dust-proof performance is required to protect the galvano scanner inside the unit from dust or the like generated in the ambient environment or at the time of machining. Meanwhile, since the unit is moved by a moving mechanism, it is required to be lightweight and have high rigidity to withstand the external force (impact force) applied during a collision or emergency stop.

Under these circumstances, a galvano scanner capable of improving the airtightness of its internal space while ensuring rigidity and a laser machining apparatus using the same are required.

A galvano scanner that performs scanning with a laser beam according to one aspect of the present invention includes a galvano unit having a mirror and a mirror drive mechanism, a base member on which the galvano unit is mounted, an outer peripheral member disposed so as to surround the galvano unit, and a frame member to which the base member and the outer peripheral member are attached, and is configured such that the base member and the outer peripheral member are attached to the frame member via a sealing member.

In a laser machining device according to another aspect of the present invention including a laser oscillator that oscillates a laser beam, a machining head with a built-in galvano scanner that performs scanning with the laser beam, and an articulated robot with the machining head attached to one end of a robot arm, the galvano scanner includes a galvano unit having a mirror and a mirror drive mechanism, a base member on which the galvano unit is mounted, an outer peripheral member disposed so as to surround the galvano unit, and a frame member to which the base member and the outer peripheral member are attached, and is configured such that the base member and the outer peripheral member are attached to the frame member via a sealing member.

According to one aspect of the present invention, with the structure in which the base member on which the galvano unit is mounted and the outer peripheral member that surrounds the galvano unit are attached to the frame member via the sealing member, a galvano scanner capable of improving the airtightness of an interior space thereof while securing the overall rigidity of the galvano scanner, and a laser machining device using the same can be realized.

DETAILED DESCRIPTION OF EMBODIMENTS OF THE INVENTION

Hereinafter, embodiments of a galvano scanner that performs scanning with a laser beam and a laser machining device using the same according to a representative example of the present invention will be described in conjunction with the drawings.

First Embodiment

Figure 1:
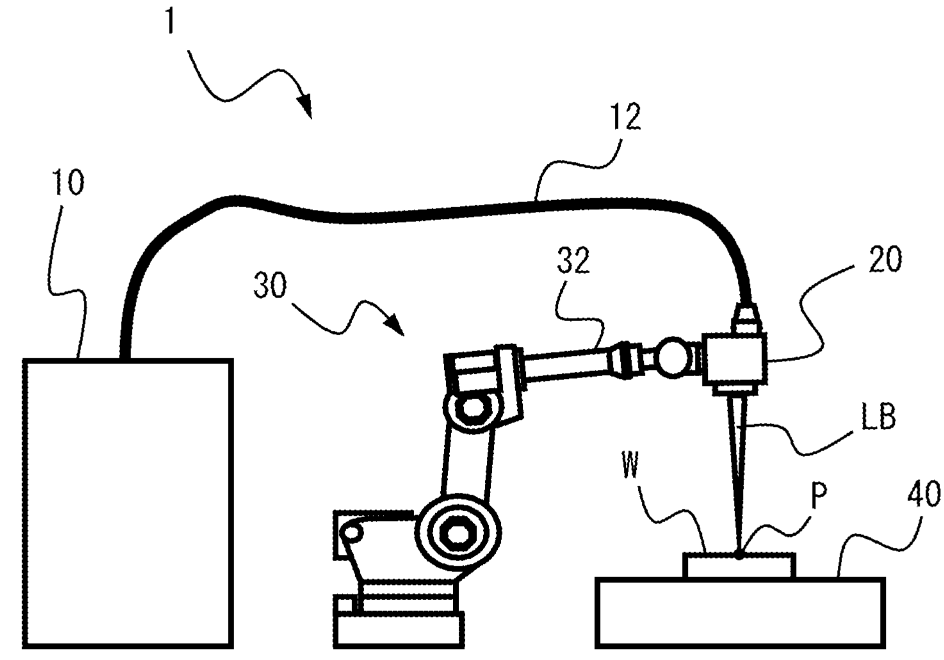
FIG. 1 is a schematic view showing a configuration of a laser machining device to which a galvano scanner according to a first embodiment is applied.
Figure 2:
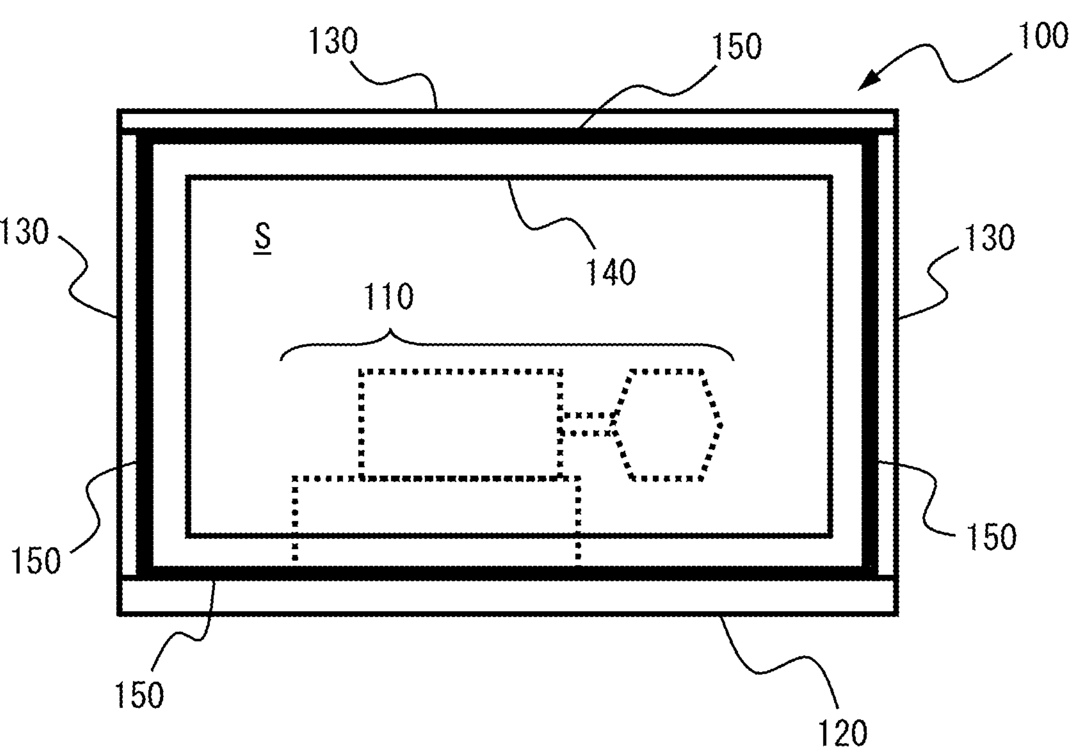
FIG. 2 is a front view showing a specific configuration of the galvano scanner according to the first embodiment.
Figure 3:
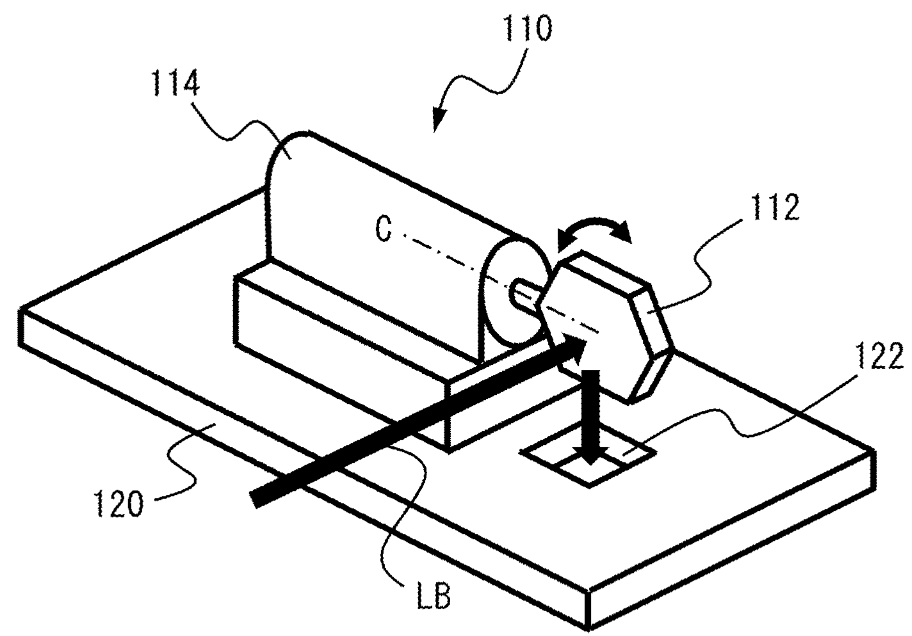
FIG. 3 is a perspective view showing an outline of components constituting the galvano scanner according to the first embodiment.
Figure 4:
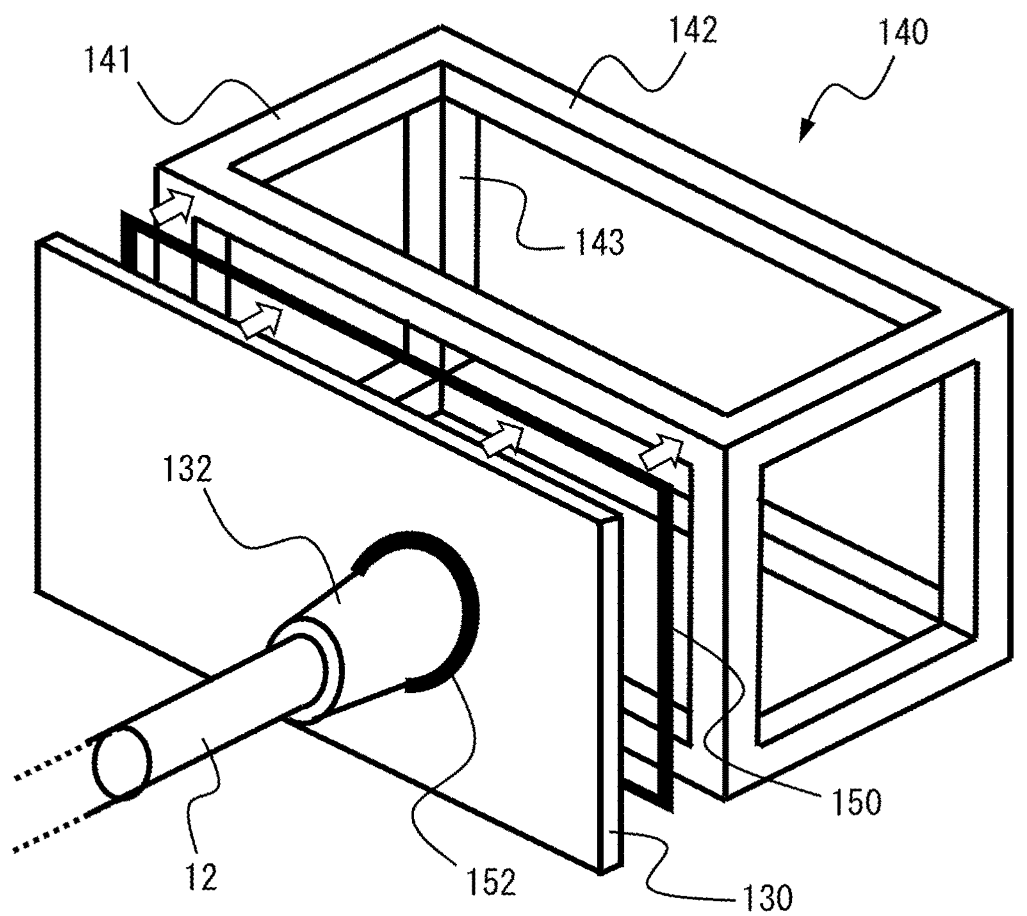
FIG. 4 is a perspective view showing an outline of components constituting the galvano scanner according to the first embodiment.
Figure 5:
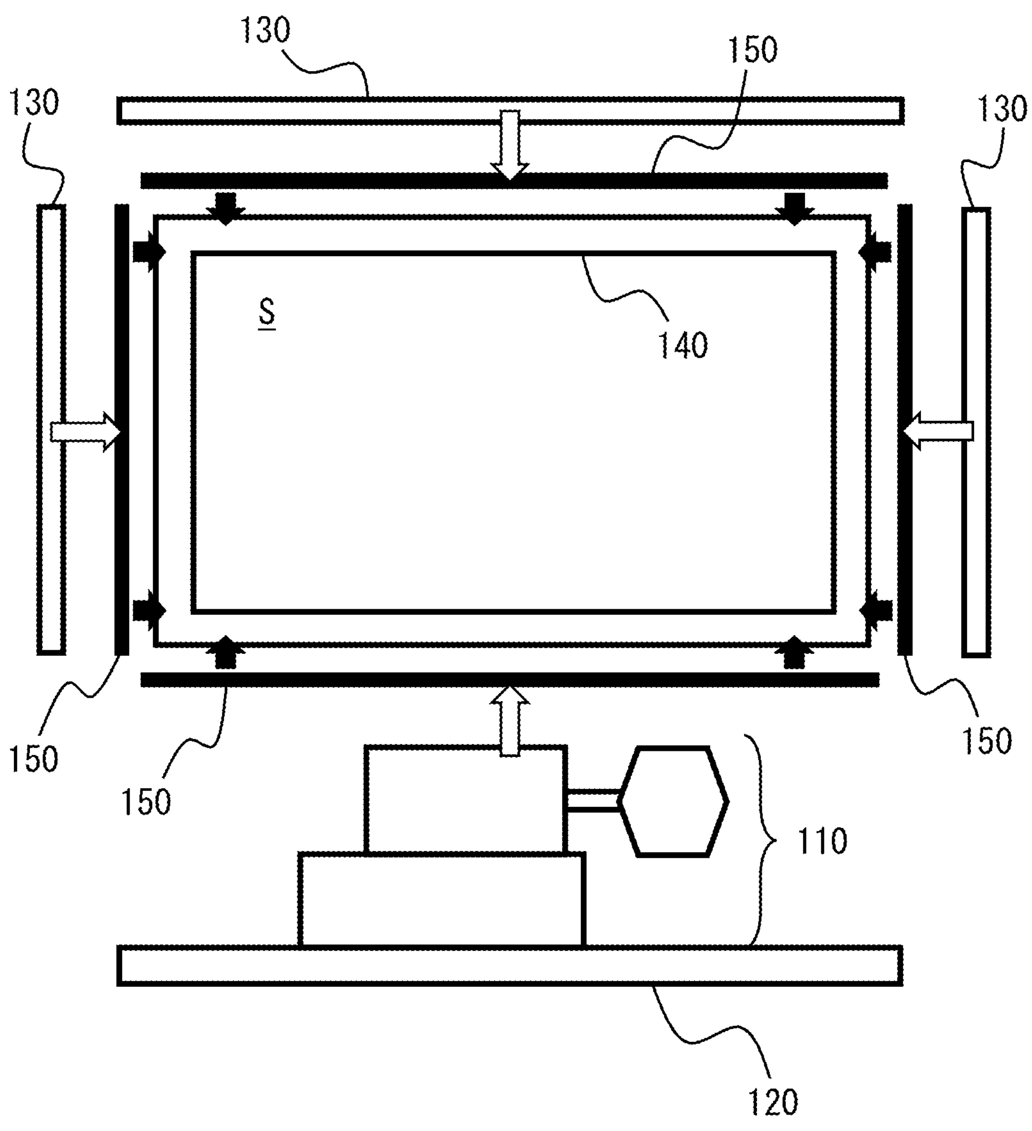
FIG. 5 is a front view showing an example of procedures in assembling the galvano scanner according to the first embodiment.

FIG. 1 is a schematic view showing a configuration of a laser machining device to which a galvano scanner according to a first embodiment is applied, as a representative example of the present invention. Further, FIG. 2 to FIG. 4 are a front view or perspective views showing a specific configuration and outlines of components of the galvano scanner according to the first embodiment. Furthermore, FIG. 5 is a front view showing an example of procedures in assembling the galvano scanner according to the first embodiment.

As shown in FIG. 1, as an example, a laser machining device 1 according to the first embodiment includes a laser oscillator 10 that oscillates a laser beam LB, a machining head 20 with a built-in galvano scanner 100 that directs the laser beam LB toward a workpiece W to perform scanning, and an articulated robot 30 with the machining head 20 attached to one end of a robot arm 32. Further, the laser machining device 1 condenses the laser beam LB on a machining point P of the workpiece W held on a machining table 40 to perform scanning, so as to perform predetermined machining (remote machining), such as welding, cutting, or drilling.

The laser oscillator 10 oscillates the laser beam LB for machining the workpiece W, and outputs the laser beam LB to the machining head 20 via a transmission path 12, such as an optical fiber. Further, the wavelength and the output of the laser oscillator 10 are determined considering the absorptivity to the workpiece W or the like. As such a laser oscillator 10, laser oscillators capable of fiber transmission of a YAG laser, a $YVO_4$ laser, a fiber laser, a disk laser, or the like can be exemplified.

The machining head 20 includes a condensing lens (not shown) and the like, as well as the built-in galvano scanner 100, which is described later, according to the present invention and condenses the laser beam LB outputted from the laser oscillator 10 on the workpiece W while performing scanning. Further, the machining head 20 may include a known configuration, such as a cooling mechanism for cooling the built-in galvano scanner 100 and the rest of optical system.

As an example, the articulated robot 30 is configured as an industrial robot of a six or seven-axis type including the robot arm 32 at least at a tip end thereof. Further, the aforementioned machining head 20 is attached to a tip end of the robot arm 32 so that the machining head 20 is moved to an any position and at an any angle within a turning range.

As an example, the machining table 40 includes a chuck mechanism (not shown) for attaching the workpiece W and securely holds the workpiece W. Further, the machining table 40 may include a rotating mechanism as well as a mechanism for moving the workpiece W in three directions of X, Y, and Z axes, for example.

As shown in FIG. 2, the galvano scanner 100 according to the first embodiment includes a base member 120 on which a galvano unit 110 is mounted, an outer peripheral member 130 disposed so as to surround the galvano unit 110, and a frame member 140 to which the base member 120 and the outer peripheral member 130 are attached. Further, in the galvano scanner 100 according to the first embodiment, the base member 120 and the outer peripheral member 130 are attached to the frame member 140 via a sealing member 150.

As shown in FIG. 3 as an example, the galvano unit 110 includes a mirror (galvano mirror) 112 that entirely reflects the laser beam LB and a mirror drive mechanism 114 that rotationally drives the mirror 112 about a predetermined rotation axis C. The mirror 112 is formed with a material that entirely reflects the transmitted laser beam LB or is configured in an aspect of being surface-treated. Further, the mirror driving mechanism 114 rotates the mirror 112, so that the laser beam LB can be scanned while being deflected in the direction of the transmission window 122 of the base member 120.

The base member 120 has the galvano unit 110 mounted thereon and causes the laser beam LB reflected by the mirror 112 of the galvano unit 110 to transmit through the transmission window 122. In this case, the transmission window 122 is preferably sealed with a material that transmits the laser beam LB (namely, a material transparent to the wavelength of the laser beam LB) to be used in order to secure the airtightness (watertightness) of the galvano scanner 100.

It should be noted that in FIG. 3, a case in which the galvano unit 110 including one set of the mirror 112 and the mirror drive mechanism 114 is used is illustrated, but the galvano unit 110 can be made so as to deflect the laser beam LB twice using two sets of the mirror 112 and the mirror drive mechanism 114. In this manner, scanning with the laser beam LB irradiated through the transmission window 122 of the base member 120 can be performed in a two-dimensional region.

The outer peripheral member 130 is disposed so as to surround the galvano unit 110 and is attached to the frame member 140, which is described later, so that a closed space S (see FIG. 1) is formed inside. In the example shown in FIG. 1, the outer peripheral member 130 is attached in a position corresponding to each of the four side surfaces and one upper surface of the frame member 140 formed substantially in a hexahedron.

As shown in FIG. 4 as an example, the frame member 140 has a substantially hexahedral frame structure consisting of a lengthwise frame 141, a widthwise frame 142, and a heightwise frame 143. Meanwhile, the outer peripheral member 130 has a shape corresponding to each of surfaces formed by the aforementioned lengthwise frame 141, widthwise frame 142, and heightwise frame 143 of the frame member 140.

Further, the frame member 140 is preferably configured as an integrally molded body of the lengthwise frame 141, the widthwise frame 142, and the heightwise frame 143, each frame having no coupling portion (namely, a joining portion, a welding portion, or the like). In this manner, since no gap is formed by coupling portions (joints) between frames, the surfaces in contact with the sealing member 150 are made flat to thus enhance the adhesion, as well as to further enhance the airtightness of the interior space S.

As shown in FIG. 4 as an example, the sealing member 150 is formed as an annular member forming sides in positions, each corresponding to the arrangement of the lengthwise frame 141, the widthwise frame 142, or the heightwise frame 143 of the frame member 140. Herein, the sealing member 150 is formed with a material capable of securing the closed state when the base member 120 and the outer peripheral member 130 are attached to the frame member 140. As such a sealing member 150, a rubber member such as an O-ring, a paste-like resin material that is available for application, or the like can be exemplified.

Further, as shown in FIG. 4, on any side surface of the outer peripheral member 130, the transmission path 12 transmitting the laser beam LB from the laser oscillator 10 is connected to the outer peripheral member 130 via a connecting member 132. In this manner, the laser beam LB is guided to the interior space S of the galvano scanner 100. In order to secure the airtightness, a sealing member 152 is provided between the connecting member 132 and the outer peripheral member 130.

As shown in FIG. 5, with the use of these components, in the galvano scanner 100 according to the first embodiment, the base member 120 on which the galvano unit 110 is mounted is disposed on the lower surface side of the frame member 140 via the sealing member 150, and the outer peripheral member 130 is disposed on each of the side surface sides and the upper surface side of the frame member 140 via the sealing member 150.

Subsequently, the frame member 140, and the base member 120 and the outer peripheral member 130 are superposed via the sealing member 150 and are integrally secured as the galvano scanner 100 by means of fixing means (for example, fastening means (illustration omitted) such as a screw or joining means such as welding or adhesion). This can enhance the airtightness (watertightness) of the interior space S while securing the rigidity of the frame member 140.

It is preferable that the base member 120 and the outer peripheral member 130 are detachably attached to the frame member 140. In this manner, when parts are exchanged due to specification changes or the like, it is only necessary to remove only a part of the base member 120 or the outer peripheral member 130, which facilitates maintenance performance.

With the configuration as described above, the galvano scanner according to the first embodiment and the laser machining device using the same are structured such that the base member on which the galvano unit is mounted and the outer peripheral member that surrounds the galvano unit are attached to the frame member via the sealing member, to thus realize the galvano scanner capable of enhancing the airtightness of the interior space while securing the overall rigidity of the galvano scanner and the laser machining device using the same.

Second Embodiment

Figure 6:
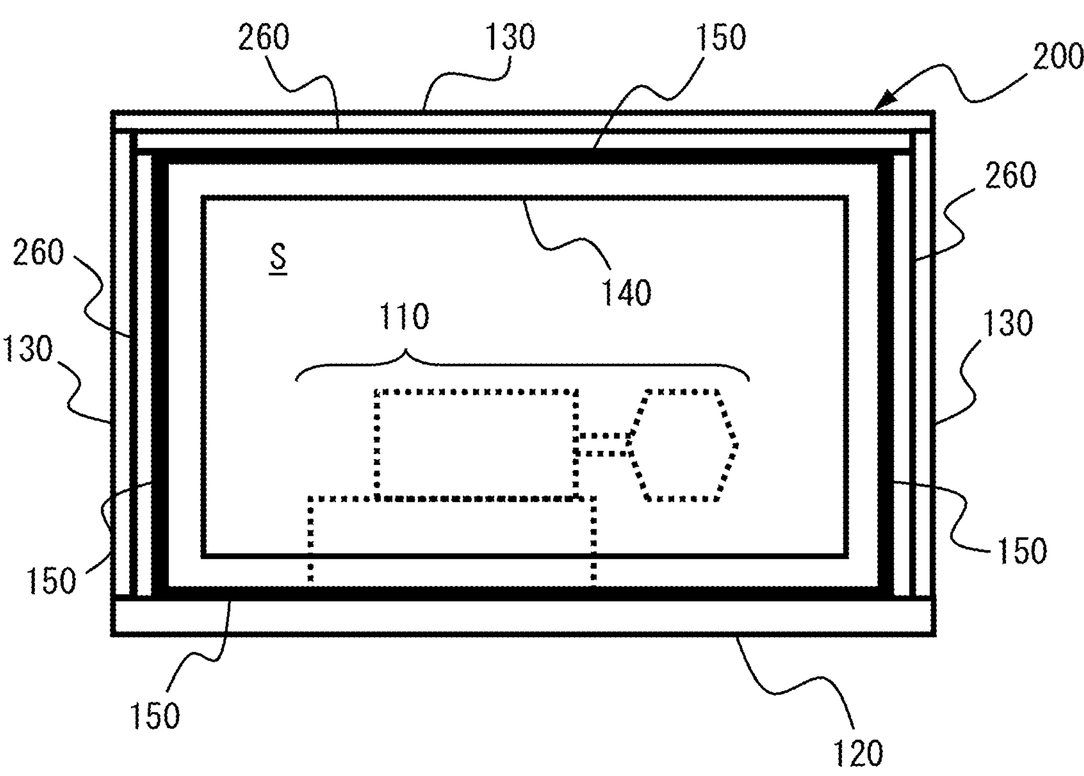
FIG. 6 is a front view showing a specific configuration of a galvano scanner according to a second embodiment.

FIG. 6 is a front view showing a specific configuration of a galvano scanner according to a second embodiment of the present invention. It should be noted that, in the second embodiment, the components that can adopt the same or common configurations as those of the first embodiment in the schematic views or the like shown in FIG. 1 to FIG. 5 are assigned the same reference signs and the repeated descriptions are omitted.

As shown in FIG. 6 as an example, a galvano scanner 200 according to the second embodiment further includes a transmitting member 260 between the outer peripheral member 130 and the sealing member 150, in addition to the galvano unit 110, the base member 120, the outer peripheral member 130, the frame member 140, and the sealing member 150 that are shown in the first embodiment. Herein, in FIG. 6, a case in which the transmitting member 260 is provided on each of the side surface sides and the upper surface side is illustrated, but the transmitting member 260 may be disposed selectively on any one or a plurality of these surfaces.

The transmitting member 260 is formed with a material that transmits the laser beam LB (namely, a material transparent to the wavelength of the laser beam LB) to be used. In this manner, even when the outer peripheral member 130 is exchanged, since the airtightness can be secured between the frame member 140 and the transmitting member 260, the maintenance performance is further improved.

With the configuration as described above, in addition to the advantageous effects described in the first embodiment, in the galvano scanner according to the first embodiment and the laser machining device using the same in the second embodiment, the transmitting member transparent to a laser beam is further disposed between the sealing member and the outer peripheral member, so that the airtightness is easily secured even when the outer peripheral member is frequently exchanged, to thus improve the maintenance performance.

It should be noted that the present invention is not limited to the aforementioned embodiments and may appropriately be changed within the scope without departing from the gist. In the present invention, modifications of any components of the embodiments or omission of any components of the embodiments may be made within the scope of the invention.

REFERENCE SIGNS LIST

1 laser machining device
10 laser oscillator
12 transmission path
20 machining head
30 articulated robot
32 robot arm
40 machining table
100 galvano scanner
110 galvano unit
112 mirror (galvano mirror)
114 mirror drive mechanism

120 base member
122 transmission window
130 outer peripheral member
132 connecting member
140 frame member
141 lengthwise frame
142 widthwise frame
143 heightwise frame
150 sealing member
152 sealing member
200 galvano scanner
260 transmitting member

The invention claimed is:

1. A galvano scanner that performs scanning with a laser beam, the galvano scanner comprising:

a galvano unit including a mirror and a mirror drive mechanism;

a base member on which the galvano unit is mounted;

an outer peripheral member disposed so as to surround the galvano unit; and a frame member to which the base member and the outer peripheral member are attached, wherein the base member and the outer peripheral member are attached to the frame member via a sealing member.

2. The galvano scanner according to claim 1, wherein the base member and the outer peripheral member are detachably attached to the frame member.

3. The galvano scanner according to claim 1 or 2, wherein the frame member is configured as an integrally molded body without a coupling portion.

4. The galvano scanner according to claim 1, further comprising a transmitting member transparent to the laser beam, between the sealing member and the outer peripheral member.

5. A laser machining device comprising:

a laser oscillator that oscillates a laser beam;

a machining head with a built-in galvano scanner that performs scanning with the laser beam; and an articulated robot with the machining head attached to one end of a robot arm, wherein:

the galvano scanner includes:

a galvano unit having a mirror and a mirror drive mechanism;

a base member on which the galvano unit is mounted;

an outer peripheral member disposed so as to surround the galvano unit; and a frame member to which the base member and the outer peripheral member are attached, and the base member and the outer peripheral member are attached to the frame member via a sealing member.

6. The laser machining device according to claim 5, wherein the base member and the outer peripheral member are detachably attached to the frame member.

7. The laser machining device according to claim 5, wherein the frame member is configured as an integrally molded body without a coupling portion.

8. The laser machining device according to claim 5, further comprising a transmitting member transparent to the laser beam, between the sealing member and the outer peripheral member.

* * * * *